(12) United States Patent
Ranade

(10) Patent No.: US 9,688,454 B2
(45) Date of Patent: Jun. 27, 2017

(54) DOUBLE BAG VACUUM INSULATION PANEL FOR STEAM CHEST MOLDING

(71) Applicant: Sonoco Development, Inc., Hartsville, SC (US)

(72) Inventor: Ajit Ranade, Naperville, IL (US)

(73) Assignee: Sonoco Development, Inc., Hartsville, SC (US)

( * ) Notice: Subject to any disclaimer, the term of this patent is extended or adjusted under 35 U.S.C. 154(b) by 548 days.

(21) Appl. No.: 14/451,535

(22) Filed: Aug. 5, 2014

(65) Prior Publication Data
US 2016/0039594 A1 Feb. 11, 2016

(51) Int. Cl.
*B65D 81/38* (2006.01)
*B32B 3/04* (2006.01)
(Continued)

(52) U.S. Cl.
CPC ............... *B65D 81/38* (2013.01); *B32B 3/04* (2013.01); *B32B 5/18* (2013.01); *B32B 15/20* (2013.01); *B32B 27/08* (2013.01); *B32B 27/304* (2013.01); *B32B 27/306* (2013.01); *B32B 27/32* (2013.01); *B32B 27/34* (2013.01); *B32B 27/36* (2013.01); *B32B 27/365* (2013.01); *B32B 2266/025* (2013.01); *B32B 2266/0228* (2013.01); *B32B 2305/026* (2013.01); *B32B 2307/304* (2013.01); *B32B 2307/31* (2013.01); *B32B 2439/80* (2013.01); *B32B 2553/00* (2013.01)

(58) Field of Classification Search
CPC ............................ B65D 81/18; B65D 81/3804; B65D 81/3813; B65D 81/3816; B65D 81/3823; B65D 81/3825; B65D 81/3886; B65D 81/3897; F25D 3/06; F25D 3/08; F25D 11/003; F25D 23/06; F25D 2331/804; A61J 1/165
USPC ........ 220/592.1–592.2, 592.24–592.27, 902, 220/915.1; 62/371, 457.2, DIG. 13
See application file for complete search history.

(56) References Cited

U.S. PATENT DOCUMENTS 2,863,179 A 12/1958 Gaugler
3,264,165 A * 8/1966 Stickel ...................... E04B 1/80
                                                              220/560.01
(Continued)

FOREIGN PATENT DOCUMENTS

CH WO 03002828 A1 * 1/2003 ............ F16L 59/065
JP WO 2014087834 A1 * 6/2014 .............. F16L 59/07

*Primary Examiner* — Chun Cheung
*Assistant Examiner* — Brijesh V. Patel
(74) *Attorney, Agent, or Firm* — Miller, Matthias & Hull LLP

(57) ABSTRACT

A double bag vacuum insulation panel for use in a temperature assured shipper made in a steam chest molding machine is provided. The double bag VIP comprises a porous core, a heat sealable inner envelope and an outer bag. The inner envelope is made from a substantially gas impermeable first material having a first thickness and defines an interior having a pressure of less than or equal to about 30 millibar. The outer bag is made from a substantially gas impermeable second material having a second thickness. The outer bag encapsulates the inner envelope. The double bag vacuum insulation panel has an R value of at least about 28 hr-ft$^2$-° F./BTU-in and the R value drops less than about 10% after being exposed to a temperature of up to 95C for up to 7 seconds.

5 Claims, 3 Drawing Sheets

(51) Int. Cl.
*B32B 27/08* (2006.01)
*B32B 27/34* (2006.01)
*B32B 5/18* (2006.01)
*B32B 15/20* (2006.01)
*B32B 27/30* (2006.01)
*B32B 27/32* (2006.01)
*B32B 27/36* (2006.01)

(56) References Cited

U.S. PATENT DOCUMENTS

| | | | |
|---|---|---|---|
| 4,284,674 A | 8/1981 | Sheptak | |
| 4,669,632 A | 6/1987 | Kawasaki et al. | |
| 4,730,748 A * | 3/1988 | Bane | B65D 81/3823 206/497 |
| 5,273,801 A * | 12/1993 | Barry | F16L 59/065 206/484.2 |
| 5,330,816 A * | 7/1994 | Rusek, Jr. | C03B 37/15 428/69 |
| 5,345,814 A | 9/1994 | Cur et al. | |
| 5,900,299 A * | 5/1999 | Wynne | B29C 44/1266 156/257 |
| 6,244,458 B1 * | 6/2001 | Frysinger | B65D 81/3823 220/592.09 |
| 7,517,576 B2 | 4/2009 | Echigoya et al. | |
| 7,950,246 B1 * | 5/2011 | Mayer | F25D 23/063 220/592.25 |
| 8,348,087 B2 * | 1/2013 | Sawaki | B65D 81/3855 220/23.86 |
| 8,663,773 B2 | 3/2014 | Jang et al. | |
| 2002/0134962 A1 * | 9/2002 | Romero | C09K 5/066 252/70 |
| 2003/0082357 A1 * | 5/2003 | Gokay | B32B 3/04 428/212 |
| 2004/0074208 A1 * | 4/2004 | Olson | B65D 81/3823 52/794.1 |
| 2008/0034788 A1 * | 2/2008 | French | F25D 3/08 62/530 |
| 2009/0179541 A1 | 7/2009 | Smith et al. | |
| 2012/0187019 A1 * | 7/2012 | Tippet | B65D 81/3823 206/524.6 |
| 2014/0021208 A1 * | 1/2014 | Anti | A01N 1/0273 220/592.25 |
| 2014/0054297 A1 * | 2/2014 | Patstone | F25D 3/08 220/592.01 |
| 2014/0144161 A1 * | 5/2014 | Pointer | B65D 81/3823 62/62 |

\* cited by examiner

DOUBLE BAG VACUUM INSULATION PANEL FOR STEAM CHEST MOLDING

FIELD OF THE INVENTION

This invention relates to a double bag vacuum insulation panel (VIP). More particularly, this invention relates to a fully manufactured vacuum insulation panel that is encapsulated inside an outer bag to resist the extreme temperature conditions of steam chest molding.

DESCRIPTION OF THE RELATED ART

Thermally insulated shippers are used to ship perishable materials such as pharmaceuticals, blood and blood products, transplant organs and food products which must be maintained within a certain temperature range. The shipping and transportation of various perishable materials frequently requires that such materials be maintained in a stable temperature range either higher or lower than the ambient temperatures to which the packaging will be exposed. A number of different types of thermally insulated containers have been developed for this purpose. They generally fall into two main categories, active shippers and passive shippers.

Active shippers are those in which the internal temperature is controlled using a battery operated device or electrical power cord. These systems usually are expensive and quite bulky. Passive shippers are those in which the internal temperature is maintained without any battery or electrical support. Different materials may be used to control the temperature, such as phase change material (material which can absorb or release heat depending on the surrounding temperature), gel bricks (ice bricks), dry ice and vacuum insulation panels (VIPs).

A vacuum insulation panel is a product composed of a rigid, highly-porous nano size material core enclosed within a metalized or non-metalized plastic bag. The core typically is made of fused silica, glass fiber, aerogel or other porous high insulation materials. To make the VIP, a plastic film bag is wrapped around the core, a vacuum is applied inside the bag, and the bag is sealed. The vacuum reduces the pressure inside the bag to within the range of 30 millibars to 1 millibar. Typically, the plastic film is 25 microns to 75 microns in thickness. Sometimes the pressure is also reduced less than 1 millibar to achieve a high insulation value.

The vacuum (lack of air molecules) is an excellent insulator where conduction, convection and radiation sources are eliminated. A VIP without any vacuum has an R value of 4-7 hr-ft$^2$-° F./BTU-in. A VIP with pressure around 5-10 millibars has R value of 28-35 hr-ft$^2$-° F./BTU-in.

VIPs are very useful as insulators due to their exceptionally high thermally insulating properties. For example, EPS and polyurethane, which are typical insulating materials, have an R value of about 4-4.5 and 5-6 hr-ft$^2$-° F./BTU-in respectively, whereas the R value for a VIP of the same thickness is typically 35-40 hr-ft$^2$-° F./BTU-in or more. In order for EPS or polyurethane to be as effective as a VIP panel, the same EPS or polyurethane sheets would need to be made about seven or eight times thicker. An open topped box of VIPs can be made from five individual panels taped together using packaging tape or strapped together using band straps. Sonoco Products Company has developed a temperature controlled shipper incorporating VIPs which is the subject of co-pending U.S. patent application Ser. No. 13/908,607. The shipper comprises VIPs sandwiched between an expanded foam outer shell and an expanded foam inner shell.

The shipper may be made using a steam chest mold according to the following method:
1. Placing inside a steam chest mold an assembly consisting of VIPs positioned inside an expanded foam outer shell;
2. Positioning a male plug within the assembly to create a space between the VIPs and the male plug; and
3. Molding via steam chest molding, an inner foam shell into the space between the VIPs and the male plug.

Any voids between the VIPs and the outer shell and the inner shell may be filled with expanded foam. As a result, the VIPs are enveloped by expanded foam material.

The plastic film which is used to encapsulate the VIP core is a thin plastic film. Some of the most common plastic films used in VIPs are multi-layer polyethylene/ethylene vinyl alcohol (PE/EVOH) and metalized polyethylene terephthalate (PET). Both PE and PET have low melting points. PE typically melts around 100-120 C. and PET starts to soften up around 130 C. Due to their low temperature resistance, these films are susceptible to tear or fracture at high temperatures such as that experienced within a steam chest mold.

During the steam chest molding process described above, the VIPs may be exposed to temperatures in the range of 80-95 C. for about three to seven seconds. Experiments show that VIPs subjected to such high temperature conditions have a drop of 20-30% in R value.

In addition to high temperatures, VIPs used in making these shippers are also subjected to moisture. During steam chest molding, moisture in the form of steam is used at high temperature, and this can cause a reduction in barrier resistance of the VIP plastic film.

These two factors (high temperature molding and steam exposure) are primary reasons that VIPs can experience a drop in R value of 20-30% when subjected to steam chest molding conditions.

The present invention is intended to solve these problems by adding an extra protective layer to a VIP, thus protecting it from high temperature and moisture during steam chest molding.

BRIEF SUMMARY OF THE INVENTION

The present invention is a vacuum insulation panel comprising a fully manufactured VIP encapsulated within a second bag to form a double bag VIP. The double bag vacuum insulation panel is intended for use in a temperature assured shipper made in a steam chest molding machine. The double bag VIP comprises a porous core, a heat sealable inner envelope and an outer bag. The inner envelope is made from a substantially gas impermeable first material having a first thickness and defines an interior having a pressure of less than or equal to about 30 millibar. The outer bag is made from a substantially gas impermeable second material having a second thickness. The outer bag encapsulates the inner envelope. The double bag vacuum insulation panel has an R value of at least about 28 hr-ft$^2$-° F./BTU-in. The R value drops less than about 10% and preferably only about 1% after being exposed to steam chest molding conditions such as a temperature of up to 95 C for up to 7 seconds.

DETAILED DESCRIPTION OF THE INVENTION

Figure 1:
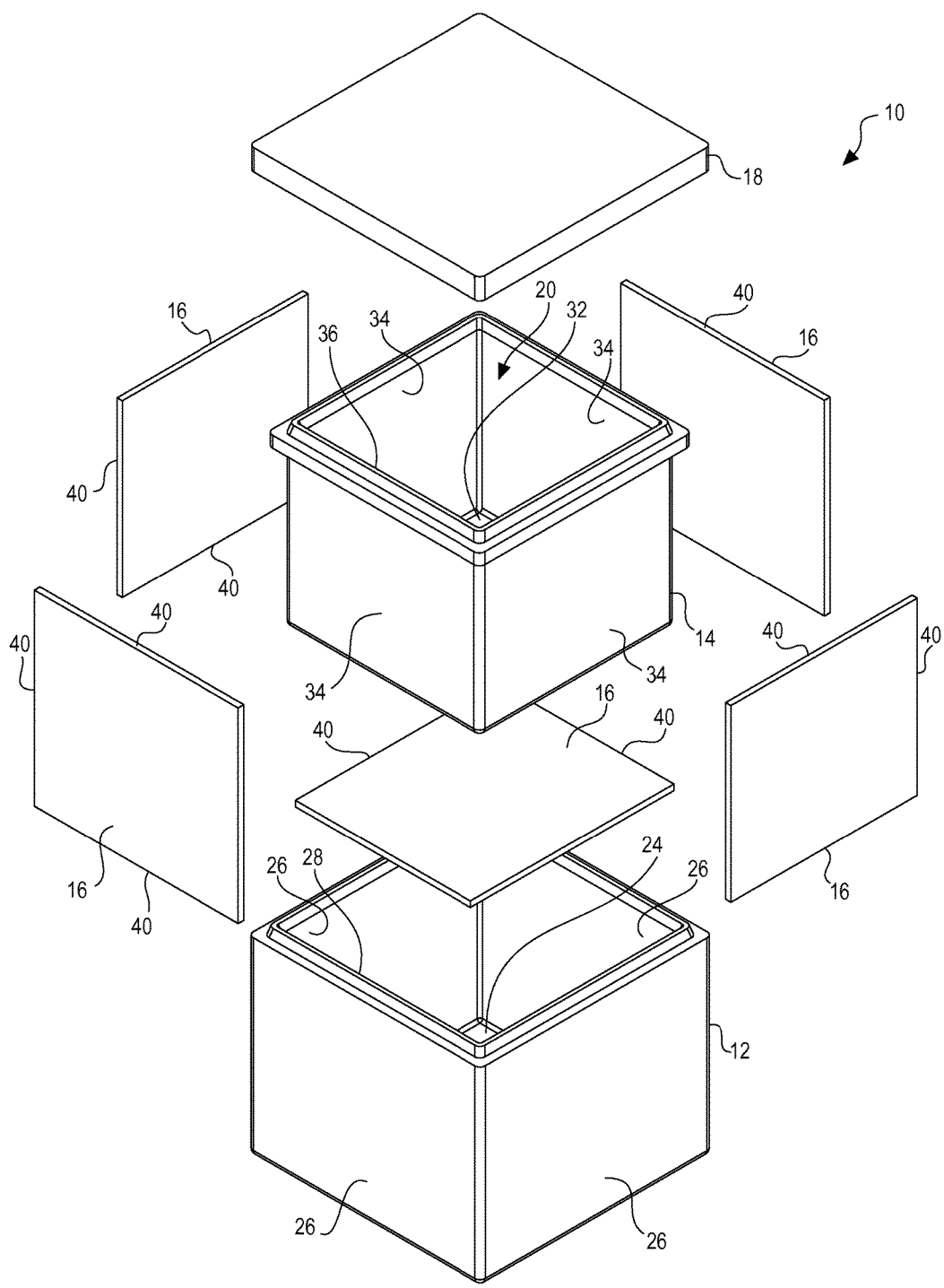
FIG. 1 is an exploded view of a thermally insulated VIP sandwich shipper for transporting temperature sensitive products.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

Thermally Insulated VIP Sandwich Shipper

Turning to the drawings, there is shown in FIG. 1 an exploded view of a thermally insulated "VIP sandwich" shipper 10 for transporting temperature sensitive products such as that disclosed in co-pending and co-owned U.S. patent application Ser. No. 13/908,607, incorporated herein by reference. The VIUP sandwich shipper 10 comprises an outer shell 12, an inner shell 14 and one or more vacuum insulation panels 16 (VIPs) located ("sandwiched") between the outer and inner shells 12, 14. Together the outer shell 12, inner shell 14 and the VIPs 16 form a box onto which a lid 18 can be fitted to form the shipper 10. The box and lid 18 together define a payload compartment 20.

The outer shell 12 may be made of expanded foam (such as expanded polystyrene (EPS), expanded polypropylene (EPP), expanded polystyrene/polyethylene (EPS/PE) or other suitable insulative material and may be shaped like an open topped box. The outer shell 12 may comprise a bottom 24 having a perimeter and sides 26 extending from the bottom perimeter and terminating in a rim 28.

Likewise, the inner shell 14 may be made of expanded foam (such as EPS, EPP, EPS/PE) or other suitable insulative material and may be shaped like an open topped box, albeit smaller than the outer shell 12 so that the inner shell 14 can nest within the outer shell 12, leaving a gap therebetween for accommodating the VIPs 16. The inner shell 14 may comprise a bottom 32 and four sides 34 extending upward from the periphery of the bottom 32 and terminating in a rim 36. The inner shell 14 may be spaced from the outer shell 12 to define a gap, the gap being sealed over to create an enclosed space.

In the assembled shipper 10, the VIPs 16 are located between the nested outer and inner shells 12, 14 which protect the VIPs 16 from punctures or tearing. Preferably the VIPs 16 are wedged against each other together so that the edge 40 of one VIP panel 16 abuts an adjacent VIP 16, thereby reducing or eliminating edge leaks.

The thermally insulated VIP sandwich shipper 10 is used to package and ship temperature sensitive products. Typically these products have a specified or required temperature range that must be maintained during a specific shipping duration and while the thermally insulated VIP sandwich shipper is subject to various ambient temperature conditions. For example, a payload may be expected to be shipped for 120 hours and be exposed to ambient temperatures of between −20 C. and 45 C. (−4 F. and 113 F.) but have a temperature tolerance of between 0 C. and 15 C. (32 F. and 59 F.). A thermally insulated VIP sandwich shipper can be designed to accommodate these requirements.

Making a Thermally Insulated VIP Sandwich Shipper in a Steam Chest Mold

The thermally insulated VIP sandwich shipper 10 may be made using a steam chest molding machine to mold the expanded foam components according to the following method. First, the outer shell 12 is molded in a steam chest molding machine. next, VIPs 16 may be placed against the bottom 24 and sides 26 of the molded outer shell 12 to create an outer shell/VIP assembly. The outer shell/VIP assembly may be placed inside a steam chest molding machine. A male plug is positioned within the outer shell/VIP assembly, leaving a space therebetween. The inner shell 14 then is molded into the space between the VIPs 16 and the male plug. After molding the inner shell 14, the VIPs 16 are sandwiched between the outer shell 12 and inner shell 14 and enclosed therebetween so that the VIPs 16 cannot be removed.

The method has a number of advantages: The molding of the inner shell 14 to the outer shell/VIP assembly in a steam chest mold can create a perfect seal between the outer shell 12 and the inner shell 14, making it difficult to distinguish where the outer shell 12 ends and the inner shell 14 starts. The method also eliminates the need for adhesive to seal the gap between the outer shell 12 and the inner shell 14. Also, during high pressure steam chest molding every void/gap between VIPs 16 and the walls of the outer shell 12 and the inner shell 14 are filled with expanded foam, thus creating nearly hermetic seal. Finally, high pressure steam chest molding helps push the VIPs 16 against each other, thus virtually eliminating edge leaks.

However, since this method involves subjecting the VIPs to steam chest molding conditions, there is a need for a vacuum insulation panel that can withstand the high temperatures and pressures experienced in steam chest molding. A "double bag" VIP has been developed for this purpose.

The Double Bag VIP

The double bag VIP of the present disclosure may be a fully manufactured VIP that is then encapsulated inside an outer bag.

Figure 2:
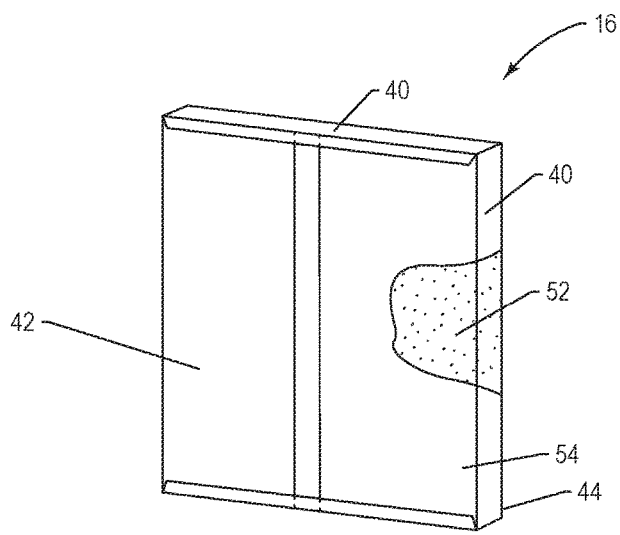
FIG. 2 is a cutaway perspective view of a vacuum insulation panel.

FIG. 2 shows a fully manufactured VIP 16 like that shown in FIG. 1. The VIP 16 may be made by a conventional process, wherein a core 52 having a three dimensional shape lacking cavities and depressions is wrapped in an envelope 54 typically made of plastic film, a vacuum is pulled and the envelope 54 is sealed around the core 52 and conforms to the brick-like shape of the core 52. The VIP 16 may be rectilinear in shape and comprise opposing first and second sides 42, 44 in addition to the four edges 40.

The inner envelope 54 may define an interior occupied solely by the core 52. The envelope 54 may be made of common plastic films such as multi-layer polyethylene/ethylene vinyl alcohol (PE/EVOH) or metalized polyethylene terephthalate (PET). The envelope thickness typically is about 1 mil.

Figures 3, 3A:
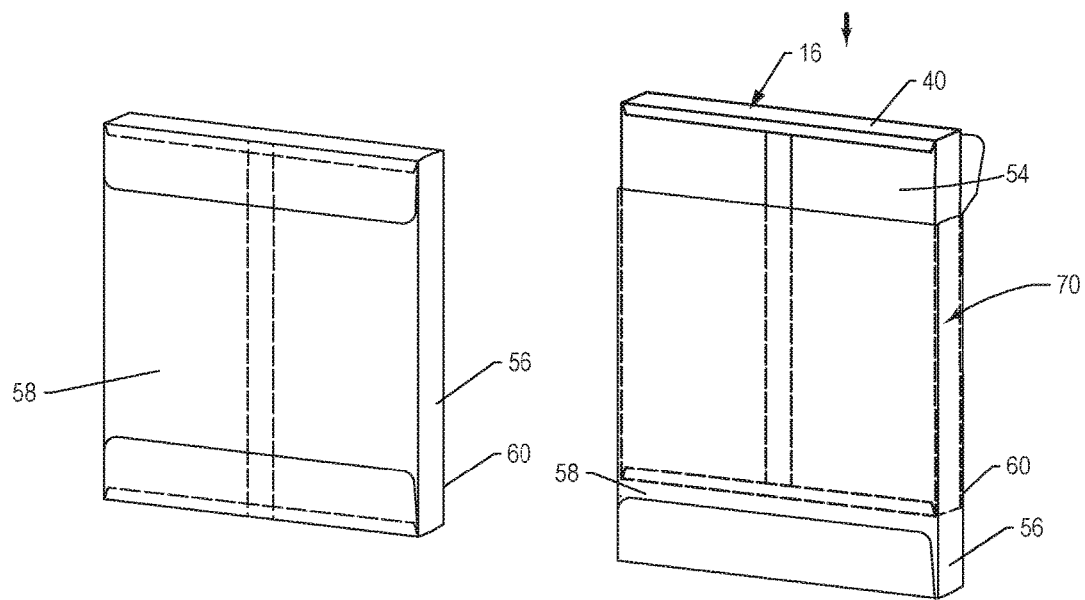
FIG. 3 is a perspective view a double bag vacuum insulation panel according to the disclosure.
FIG. 3a is a perspective view of the VIP of FIG. 1 being inserted into an outer bag.

FIG. 3a shows the VIP 16 being inserted into an outer bag 56. The outer bag 56 may be pre-formed, that is, pre-shaped so that the VIP 16 fits snugly inside. More specifically, the outer bag 56 may be rectilinear in shape and comprise opposing first and second sides 58, 60 having dimensions similar to the first and second sides 42, 44 of the VIP 16. A bottom edge 62 and side edges 64 extend between the first and second sides 58, 60. Once the VIP 16 is inserted into the outer bag 56, the top flap of the outer bag 56 may be sealed as shown in FIG. 3.

Figure 4:
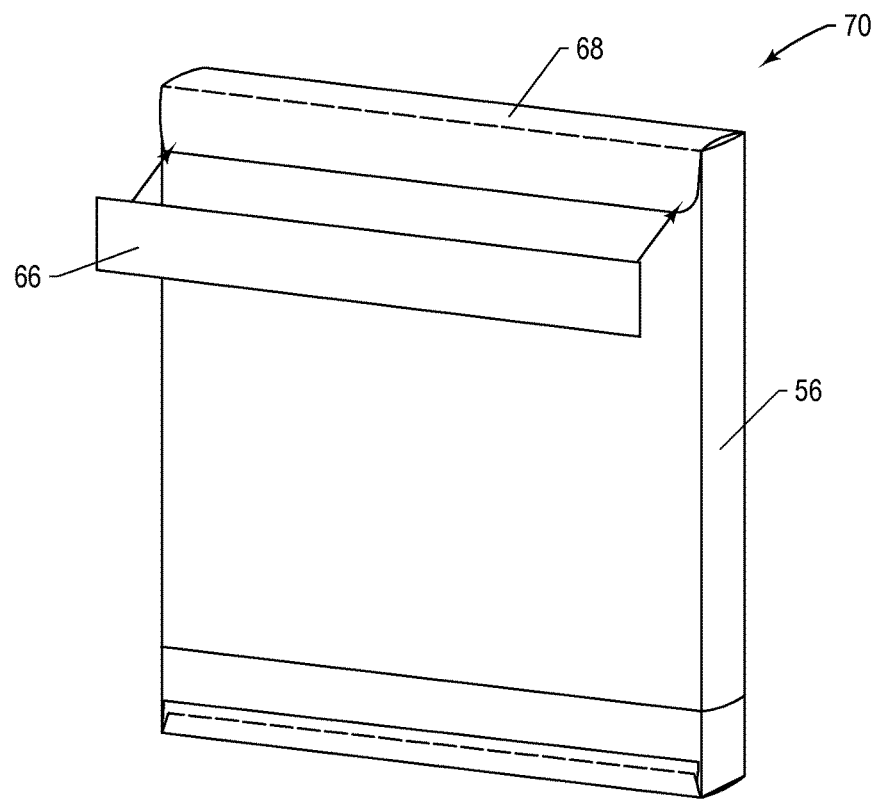
FIG. 4 is a perspective view of the outer bag being sealed around the VIP with a sealing strip.

FIG. 4 shows the outer bag 56 being sealed around the VIP 16 with a sealing strip 66. A top (closure) flap 68 extends from the second side 60 and is configured to be folded over the exposed top edge 40 of the VIP 16 and lie flat against the first side 58. The sealing strip 66 may then be used to secure the flap against the first side 58. Alternatively, and without limitation, the flap 68 may include adhesive for adhering to the first side 58.

Figure 5:
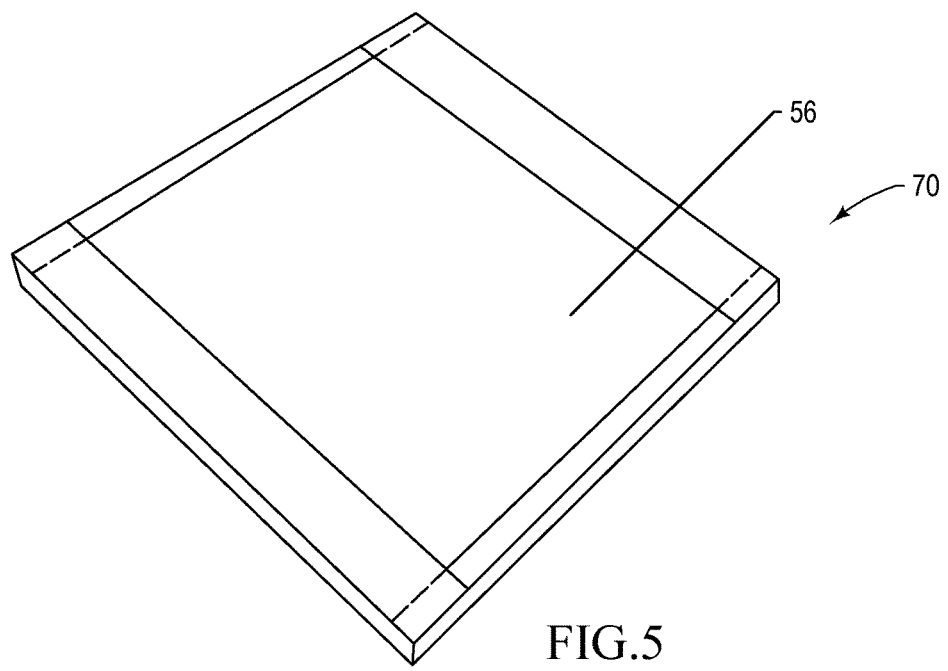
FIG. 5 is another perspective view a double bag vacuum insulation panel according to the disclosure.

FIG. 5 is a perspective view of a "double bag" VIP 70 according to the disclosure. The fully manufactured VIP 16 is securely encapsulated within the outer bag 56. The outer bag 56 should be temperature and moisture resistant, and may be made of Nylon. The outer bag 56 may also be made of other materials such as PET, polyethylene terephthalate glycol modified (PETG), PE, PP, ethyl vinyl acetate (EVA), EVOH, polyvinylidene fluoride (PVDF), polycarbonate (PC), polyvinyl chloride (PVC), aluminum foil or other plastic materials used in film making, or a combination of these materials.

The film used to make the outer bag 56 may be either monolayer or made of multiple layers to give added protection. Multiple layers can offer multiple forms of protection. For example, PE has excellent resistance to moisture; Nylon has excellent resistance to oxygen. By selecting each layer carefully, a double bag VIP can be created having a strong structure with excellent barrier properties.

The outer bag 56 may have a thickness of between about 1 mil and about 15 mil (about 25 microns and 375 microns), and preferably between about 6 mils and 10 mils (about 152 microns and 254 microns).

EXAMPLE

Experiments show that VIPs subjected to steam chest molding conditions, such as temperatures in the range of 80-95 C for about three to seven seconds, have a drop of 20-30% in R value. Thus a drop of only 10% in the R value of a VIP after steam chest molding would represent a significant advance over a conventional VIP.

In one example, a double bag VIP 70 according to the disclosure having an outer bag 56 made of multi-layer Nylon/EVOH film and having a thickness of 8 mil (about 203 microns) had an R value drop after steam chest molding of only about 1%.

This there has been described a vacuum insulation panel 70 having an R value of at least about 28 hr-ft$^2$-° F./BTU-in and wherein the R value drops about 10% or less, and preferably about 1% or less, after being exposed to a temperature of up to 95 C. for up to 7 seconds such as might occur in a steam chest molding machine.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

What is claimed is:

1. A vacuum insulation panel comprising:
   a core comprising a porous material, the core defining a three dimensional shape lacking cavities and depressions;
   a heat sealable inner envelope made from a substantially gas impermeable first material having a first thickness, the inner envelope defining an interior occupied solely by the core, the inner envelope encapsulating the core so there are no gaps or spaces between the inner envelope and the core, the interior having a pressure of less than or equal to about 30 millibar; and
   an outer bag consisting of a layer of substantially gas impermeable nylon and having a second thickness, the outer bag encapsulating the inner envelope; wherein
   the vacuum insulation panel has an R value of at least about 28 hr-ft$^2$-° F./BTU-in; and
   the R value drops less than about 10% after being exposed to a temperature of up to 95° C. for up to 7 seconds.

2. The vacuum insulation panel of claim 1 wherein:
   the vacuum insulation panel has an R value of at least about 28 hr-ft$^2$-° F./BTU-in and the R value drops less than about 1% after being exposed to a temperature of up to 95° C. for up to 7 seconds.

3. The vacuum insulation panel of claim 1 wherein:
   the second thickness is between 25 microns and 375 microns.

4. The vacuum insulation panel of claim 1 wherein:
   the second thickness is between 75 microns and 375 microns.

5. The vacuum insulation panel of claim 1 wherein:
   the R value drops less than about 1% after being exposed to a temperature of up to 95° C. for up to 7 seconds.

* * * * *